UNITED STATES PATENT OFFICE 2,451,298

HYDROGENATION OF UNSATURATED CYCLIC SULFONES

Rupert C. Morris and Norten C. Melchior, Berkeley, Calif., assignors to Shell Development Company, San Francisco, Calif., a corporation of Delaware No Drawing. Application November 27, 1943, Serial No. 512,048

7 Claims. (Cl. 260—329)

This invention relates to the production of sulfolane compounds, and more particularly pertains to a novel process whereby sulfolene compounds, especially those containing an unsaturated or double bond in the 3-position in the ring or nucleus, may be effectively and economically hydrogenated to produce the corresponding saturated cyclic sulfones, i. e. the corresponding sulfolane compounds.

The term "a sulfolene compound," as employed herein and in the appended claims, refers to and covers generically the unsubstituted and substituted unsaturated compounds comprising or containing a sulfolene nucleus, i. e. a five-membered ring of four carbon atoms and a sulfur atom, a single olefinic linkage between any two adjacent carbon atoms of said ring, and two oxygen atoms each of which is directly attached to the sulfur atom thereof. The generic term "a sulfolene compound," therefore, covers the simple unsubstituted sulfolenes, viz. the 3-sulfolene having the general structure

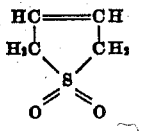

and the 2-sulfolene or 4-sulfolene having the structure

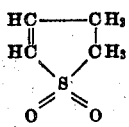

as well as the various substituted derivatives thereof, i. e. sulfolene compounds in which various organic and/or inorganic, and particularly hydrocarbon radicals, i. e. alkyl, alkenyl, aryl, aralkyl, alkaryl, alicyclic and/or heterocyclic radicals, are substituted for one or more of the hydrogen atoms of the above unsubstituted sulfolenes.

Similarly, the term "a sulfolane compound" refers to a saturated sulfolene compound. In other words, the sulfolane compound contains or consists of a saturated five-membered ring of four carbon atoms and a sulfur atom, the latter having two oxygen atoms directly attached thereto. The structural formula of the simple unsubstituted sulfolane, therefore, is

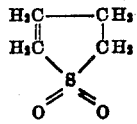

the generic term "a sulfolane" or "a sulfolane compound" covering not only the above compound, but also the substituted derivatives thereof, particularly those in which various organic compounds are substituted for one or more of the hydrogen atoms of the above structure.

It has been previously proposed to produce the simple unsubstituted sulfolane, i. e. 2,3,4,5-tetrahydrothiophene-1,1-dioxide, by subjecting 3-sulfolene (also known as 2,5-dihydrothiophene-1,1-dioxide) to the action of hydrogen in the presence of a base metal hydrogenation catalyst. Because of certain inherent defects, this process of producing the sulfolane is of very limited utility. For instance, 3-sulfolene is quite unstable and decomposes into butadiene and sulfur dioxide at temperatures in the neighborhood of 120° C. to 125° C. On the other hand, the catalytic hydrogenation reaction is of a highly exothermic character. Therefore, when 3-sulfolene is to be hydrogenated in the presence of a metal hydrogenation catalyst and according to the known processes, it is necessary to control the reaction temperature very carefully to prevent any excessive rise thereof into or close to the region in which the aforesaid decomposition occurs. This requires complicated and costly means for cooling of the reactor, and/or a relatively slow introduction of hydrogen into the 3-sulfolene, thereby lowering the yield of the desired hydrogenated product per unit of time. Additionally, it was found that the catalyst employed for the hydrogenation of 3-sulfolene and, in fact, of other sulfolene compounds, and particularly those containing an unsaturated linkage in the 3-position in the nucleus, is de-activated in a relatively short period of time even if the hydrogenation reaction is effected at a temperature which is below the decomposition temperature of the sulfolene compound treated.

It is an object of the present invention to avoid the above and other defects, and to provide an economical process for the production of sulfolane compounds. Another object is to provide a process whereby sulfolene compounds, and especially the sulfolene compounds containing an olefinic linkage in the 3-position in the ring, may be rapidly, economically and substantially quantitatively hydrogenated to the corresponding sulfolane compounds. A further object is to provide a process in which the catalyst employed for the hydrogenation will have a markedly longer life, thus avoiding the necessity of frequent interruption of the reaction for the re-activation and/or replacement of said catalyst. Still other objects will be apparent from the following description of the invention.

It has now been discovered that the above and other objects may be attained by effecting the catalytic hydrogenation of the sulfolene compounds, preferably in the liquid state and/or in solution in an inert solvent, in the presence of a hydrogenation catalyst and of a small amount of a basic or basic-acting material. More specifically stated, it has been discovered that the presence of even small amounts of a basic or basic-acting material during the hydrogenation of a sulfolene compound, particularly of a sulfolene compound containing an unsaturated linkage in the 3-position, permits the use of operating temperatures which are considerably higher than those which may be employed during the catalytic hydrogenation of the sulfolene compound in the absence of such basic or basic-acting substance. Also, the use of this basic or basic-acting material during the hydrogenation of the sulfolene compounds materially increases the active life of the hydrogenation catalyst.

The invention may therefore be stated to reside in a process of producing sulfolane compounds by subjecting the corresponding sulfolene compounds, particularly the sulfolene compounds containing an unsaturated linkage in the 3-position, to the action of hydrogen in the presence of a hydrogenation catalyst, e. g. a metal hydrogenation catalyst of the type described hereinbelow, this hydrogenation being effected in the presence of small amounts of a basic or basic-acting material. During this catalytic hydrogenation, the sulfolene compound is preferably maintained in the liquid state, for example by maintaining it above its melting point or in solution in a suitable solvent such as benzene, dioxane, alcohols, e. g. methyl, ethyl, isopropyl or tertiary butyl alcohol, and even the sulfolane compound itself. The use of the basic or basic-acting materials during the hydrogenation of the sulfolene compounds permits the effecting of the hydrogenation reaction at relatively high temperatures without causing the decomposition of the cyclic sulfones. This, in turn, allows greater throughputs, and therefore higher yields of the sulfolane compounds per unit of time.

As stated, the presence of even small amounts of the basic compounds during the catalytic hydrogenation of the sulfolene compounds maintains the activity of the hydrogenation catalyst for a considerably longer period of time as compared to the active life of the same catalyst when the same sulfolene compound is catalytically hydrogenated in accordance with the process of the prior art. Therefore, when the production of sulfolane compounds is effected in accordance with the process of the present invention, there is a considerable decrease in the frequency of interruptions necessary for the reactivation and/or replacement of the hydrogenation catalyst, which in turn materially increases the efficiency of the process. In this connection, it must be noted that it has been previously considered that sulfolene compounds, especially those containing an unsaturated linkage in the 3-position in the ring, will react with alcohols, particularly in an alkaline medium. One of the unexpected features of the present invention resides in the fact that when sulfolene compounds are dissolved in a solvent of the type of an alcohol, e. g. ethyl alcohol, isopropyl alcohol, and the like, and the solution thus produced is contacted with hydrogen in the presence of a hydrogenation catalyst and of a basic material, e. g. an alkali metal hydroxide, there is no interaction between the sulfolene compound and the alcohol. Even when the hydrogenation is effected according to the process of the present invention in the presence of an alcohol diluent and at relatively high temperatures and pressures, the reaction product is substantially free from sulfolanyl ethers (which are the reaction products formed by the addition of an alcohol to a sulfolene compound), the hydrogenation of the sulfolene compound to the corresponding sulfolane compound being substantially quantitative.

Although the hydrogenation in accordance with the process of the present invention may be effected in the presence of any basic or basic-acting material, a preferred subclass of these materials comprises the alkali metal and alkali earth metal hydroxides, such as sodium, potassium and cadmium hydroxides, as well as the corresponding carbonates, bicarbonates, and the like. Also, alkali metal alcoholates, as well as the organic amines, e. g. isopropyl amine, may be employed. The amount of these basic or basic-acting materials to be added to the reactants will depend in part upon a number of variables, such as the specific sulfolene compound and the particular basic material employed. Generally speaking, the amount of such basic material may vary from a minor fraction of a percent, e. g. from about 0.02% to about 2%, by weight of the sulfolene compound to be hydrogenated. However, amounts as high as 5% may also be used and may even be desirable in some instances. It has been discovered that, as a general rule, and particularly when the unsubstituted sulfolenes or those containing one or more alkyl radicals attached to one or more nuclear carbon atoms, are to be hydrogenated according to the present process, highly satisfactory results may be attained by employing an alkali metal hydroxide in an amount equal to between about 0.05% and about 0.5% by weight of the sulfolene compound subjected to catalytic hydrogenation, excellent yields having been attained by using sodium hydroxide in an amount equal to about 0.1%. The term "basic material," as employed in the appended claims, also includes the various basic-acting substances.

The process of this invention is applicable to the production of sulfolane compounds by the catalytic hydrogenation of any sulfolene compound. A preferred class of these sulfolene compounds comprises those which contain an olefinic linkage in the 3-position. However, the process is also applicable to the catalytic hydrogenation of sulfolene compounds which contain olefinic linkages in the 2-position in the ring. A particularly suitable sub-class of compounds which may be employed as the starting materials comprises sulfolenes having the general formula

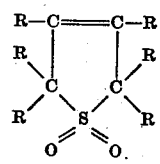

wherein each R represents either the hydrogen atom or a hydrocarbon radical, particularly an aliphatic radical which may be saturated or unsaturated. As will be shown, it has been found that the catalytic hydrogenation in accordance with the process of the present invention of a sulfolene compound having an unsaturated aliphatic side chain and a nuclear unsaturation preferentially hydrogenates the double bond in the ring so that the reaction product consists of or at least predominates in a sulfolane compound containing an unsaturated aliphatic side-chain. Sulfolene compounds of the type of 3-sulfolene, 2-methyl-3-sulfolene, 3-methyl-3-sulfolene, 3-ethyl-3-sulfolene, 2,4-dimethyl-3-sulfolene, and their homologues, as well as other sulfolene compounds in which hydrocarbon radicals, such as methyl, ethyl, vinyl, propyl, isopropyl, propenyl, allyl, isopropenyl, butyl, isobutyl, butenyl, isobutenyl, pentenyl, amyl, hexyl, isohexyl, isohexenyl, cyclobutyl, cyclopentyl, cyclopentenyl, phenyl, benzyl, xylyl, and other like radicals are substituted for one or more of the hydrogen atoms of the unsubstituted sulfolene compounds, are representative examples of the compounds falling within the above preferred subgroup. Also, other derivatives of these sulfolene compounds, e. g. those in which inorganic radicals or groups such as a halogen atom, a hydroxyl group, or the like, are substituted for one or more of the hydrogen atoms of the nuclear and/or side-chain carbon atoms, may be employed as the starting materials.

Although the hydrogenation step may be effected at any temperature and pressure, one of the advantages of the present process resides in the fact that the presence of the minor amounts of the basic or basic-acting material permits the catalytic hydrogenation at considerably higher temperatures than those which may be used if the hydrogenation were to be effected in the absence of such basic compounds. The realization of the hydrogenation reaction in accordance with the process of the present invention is possible even at temperatures at which the sulfolene compound would normally decompose into sulfur dioxide and a polyolefin. Generally speaking, the hydrogenation of sulfolenes when effected in accordance with the process of the present invention may be realized at relatively low temperatures, e. g. from 35° C. to 10° C., or even lower, e. g. about 0° C. However, at least in some cases, it is preferable to effect the hydrogenation at considerably higher temperatures, e. g. as high as 100° C. to 200° C. or even higher. As to the reaction pressure, any positive hydrogen pressure may be employed. Although the reaction may be realized at atmospheric pressure, highly satisfactory results have been attained by employing relatively very high pressures, e. g. of the order of from 100 to 150 atmospheres, although in some instances the use of considerably lower pressures, e. g. of the order of about 100 lbs. or even less, resulted in a satisfactorily rapid hydrogenation. It may be stated that an increase in the operating temperature and/or pressure will permit the realization of the reaction within a much shorter period of time. The optimum hydrogen pressure and the optimum operating temperature will depend on many variables, such as the particular sulfolene compound treated, the specific catalyst employed, the ratio of catalyst to the sulfolene compound, the concentration of the basic or basic-acting material in the reacting mixture, the rate of reaction desired, the pressure capacity of the equipment used, the presence or absence of a diluent, etc.

The hydrogenation may be effected in the presence of any hydrogenation catalyst, and preferably a metal hydrogenation catalyst. Although active nickel is a highly desirable hydrogenation catalyst, it has been found that for the purpose of this invention suitable metal hydrogenation catalysts may contain or consist of other metals such as cobalt, copper, platinum, palladium, or mixtures of these metals with themselves or with other metals such as iron, zinc, chromium, cadmium, etc. These catalysts may be prepared in any suitable manner. For instance, an active nickel catalyst may be prepared by gradually heating purified nickel nitrate to about 350° C. to 400° C., followed by a reduction of the nickel oxide thus produced in a stream of hydrogen at temperatures in the neighborhood of from 300° C. to 350° C. A particularly suitable active nickel catalyst material is a finely divided active nickel which may be used in suspension in the liquid solution comprising or containing the sulfolene compound to be hydrogenated. Such active nickel may be produced by known methods such as the decomposition of nickelous formate at about 250° C. The optimum amount of the hydrogenation catalyst to be employed will depend on a number of variables, e. g. the sulfolene compound treated, the specific hydrogenation catalyst employed, and the hydrogen pressure and temperature used.

The basic or basic-acting material may be employed in the form of its aqueous solution or dissolved in an anhydrous solvent, e. g. an alcohol such as the alcohol of the type of methyl, ethyl or isopropyl alcohol which is used as the solvent and diluent for the sulfolene compound treated.

The following examples are presented to illustrate further the nature of the invention and the advantages derived from the utilization thereof. It is to be understood that there is no intention of being limited by any details of execution described in said examples.

Example I

Approximately 750 grams (i. e. about 5.13 mols) of 2,4-dimethyl-3-sulfolene, together with about 1000 cc. of isopropyl alcohol and 150 grams of an active alloy-skeleton nickel catalyst, were introduced into a hydrogenation vessel which was then filled with hydrogen until the hydrogen pressure was equal to about 1800 lbs. During the hydrogenation reaction the contents of the reactor were maintained in a state of agitation. It was found that only a small amount of the hydrogen was taken up by the sulfolene compound, and that in a very short time no further hydrogenation occurred. Upon opening of the vessel, it was discovered that the catalyst was no longer pyrophoric and was de-activated to such a degree that it could not be employed for any further catalytic hydrogenation of the sulfolene compounds.

Example II

Approximately 750 grams of 2,4-dimethyl-3-sulfolene, together with about 1000 cc. of isopropyl alcohol, about 150 grams of an active nickel alloy skeleton catalyst, and about 7 grams of 96% NaOH were introduced into the same hydrogenation vessel as that employed in the previous example. The mixture was then subjected to a hydrogen pressure of about 1800 lbs. and agitated. The hydrogenation was very rapid and substantially complete, the temperature rising from about 10° C. to about 22° C. At the termination of the reaction the products were filtered and distilled in a Claisen flask, the reaction product boiling at about 123.3° C. at 5 mm. of mercury pressure. The product had a specific gravity $d_4^{20}$ of 1.1362 and a refractive index $n_D^{20}$ of 1.4733. From these and other data it was found that the product was substantially pure 2,4-dimethylsulfolane. This compound is miscible with acetone and benzol, and substantially insoluble in kerosene and cyclohexane. It is miscible with water at about 80° C. and is about 10% soluble in water at room temperature. The catalyst recovered from the above reaction was found to be active and was effectively employed for the hydrogenation of additional quantities of the above sulfolene compound.

*Example III*

Approximately 500 grams of 2,4-dimethyl-3-sulfolene were mixed with about 500 cc. of isopropyl alcohol, about 4.6 grams of sodium hydroxide, and about 100 grams of an active nickel catalyst. This mixture was then subjected to an initial hydrogen pressure of 40 lbs. per sq. in., this hydrogen pressure being gradually raised to about 300 lbs. per sq. in. at such a rate that the temperature did not materially rise over 25° C. The reaction was complete in about 30 minutes, all of the sulfolene being converted to 2,4-dimethylsulfolane. The catalyst recovered was found to be very active and was employed for the catalytic hydrogenation of several additional batches of 2,4-dimethyl-3-sulfolene.

*Example IV*

Approximately 1500 grams of 2,4-dimethyl-3-sulfolene mixed with 2000 cc. of isopropyl alcohol, 21 grams of sodium hydroxide, and 100 grams of a nickel catalyst were subjected to the action of hydrogen at substantially atmospheric pressure. Although this hydrogenation reaction resulted in a substantially quantitative conversion to 2,4-dimethylsulfolane, this reaction required approximately 20 hours for such substantially quantitative hydrogenation. The catalyst recovered was found to be still quite active.

On the other hand, when the same sulfolene compound dissolved in ethyl alcohol was hydrogenated in the presence of the same metal catalyst under substantially similar conditions but in the absence of the basic or basic-acting compound, less than 40% of the sulfolene compound charged was hydrogenated and the catalyst was found to be completely inactive at the end of the run.

*Example V*

Approximately 1535 grams (13 mols) of unrecrystallized 3-sulfolene, together with 10,080 cc. of water, 15 grams of sodium hydroxide, and 60 grams of an active nickel catalyst, were introduced into a hydrogenation reactor and subjected to the action of hydrogen. After the hydrogenation proceeded to a point at which approximately 58% of the sulfolene was converted to sulfolane, further absorption of the hydrogen stopped. However, upon the introduction of additional amounts of sodium hydroxide, the hydrogenation could be carried to a substantially complete conversion of the 3-sulfolene to sulfolane.

*Example VI*

About 47 grams (0.235 mol) of 3-(4-methyl-3-pentenyl)-3-sulfolene, which is also known as myrcene sulfone, were mixed with 150 cc. of isopropyl alcohol, 10 grams of a nickel hydrogenation catalyst, and 0.3 gram of sodium hydroxide. The mixture was then subjected to a hydrogen pressure of about 57 lbs., the reaction being realized at a temperature which rose to about 35° C. At the end of about 25 minutes, the solvent was flashed off and the product distilled. The reaction product had a boiling point of 128° C. to 131° C. at 1.5 mm. of mercury pressure and was found to consist of 3-isohexenyl-sulfolane. This run shows that the hydrogenation of a sulfolene compound containing an aliphatic unsaturated side chain selectively hydrogenates the unsaturated linkage in the nucleus.

The 2,4-dimethylsulfolane, which may be produced by the above described process of catalytic hydrogenation of 2,4-dimethyl-3-sulfolene, is a novel and highly valuable compound. As mentioned, it has a specific gravity $d_4^{20}$ of 1.1362, a refractive index $n_D^{20}$ of 1.4733, and boils at about 123.3° C. at 5 mm. of mercury pressure. It is an excellent selective solvent, and may be used in the separation of mixtures of various organic materials, particularly of hydrocarbon mixtures of different degrees of unsaturation, e. g. separation of toluene from mixtures thereof with other hydrocarbons of the type of methyl cyclohexane. Also, this compound is an excellent solvent for substances of the type of polyvinyl chloride and co-polymers, such as those produced by the interaction of vinyl chloride with vinyl acetate. Additionally, 2,4-dimethylsulfolane may be effectively used as a hydraulic fluid ingredient as well as an intermediary in the production of various other valuable organic compounds and compositions.

We claim as our invention:

1. In a process for the production of 2,4-dimethylsulfolane wherein 2,4-dimethyl-3-sulfolene is brought, in the liquid state and in the presence of an active nickel hydrogenation catalyst, in contact with hydrogen at a temperature below that at which 2,4-dimethyl-3-sulfolene undergoes thermal decomposition, the improvement which comprises effecting said catalytic hydrogenation reaction in the presence of sodium hydroxide employed in an amount between about 0.05% and about 0.5% by weight of the sulfolene compound treated.

2. The presence according to claim 1 wherein the catalytic hydrogenation is effected under a positive hydrogen pressure.

3. In a process for the production of 2,4-dimethylsulfolane wherein 2,4-dimethyl-3-sulfolene is reacted, in the liquid state and in the presence of an active nickel hydrogenation catalyst, with hydrogen at a temperature below that at which 2,4-dimethyl-3-sulfolene undergoes thermal decomposition, the improvement which comprises effecting said catalytic hydrogenation in the presence of sodium hydroxide employed in an amount equal to between about 0.02% and about 5% by weight of the compound treated.

4. A process for the production of sulfolane which comprises contacting 3-sulfolene, in the liquid state and at a temperature below that at which said 3-sulfolene undergoes thermal decomposition, with hydrogen, and effecting the hydrogenation of the 3-sulfolene at a superatmospheric pressure and in the presence of an active nickel hydrogenation catalyst and of an amount of sodium hydroxide equal to between about 0.02% and about 5% by weight of the 3-sulfalene treated.

5. A process for the production of sulfolane which comprises reacting 3-sulfolene, in the liquid state, with hydrogen at a temperature below that at which said 3-sulfolene undergoes thermal decomposition, and in the presence of an active nickel hydrogenation catalyst and of an amount of sodium hydroxide equal to between about 0.02% and about 5% by weight of the 3-sulfolene treated.

6. In a process for the production of 3-isohexenyl-sulfolane wherein 3-(4-methyl-3-pentenyl)-3-sulfolene is reacted, in the liquid state and in solution in an inert diluent, with hydrogen at a temperature below that at which said sulfolane compound undergoes thermal decomposition, the improvement which comprises effecting the hydrogenation reaction in the presence of an active nickel hydrogenation catalyst and of an amount of sodium hydroxide equal to between about 0.02% and about 5% by weight of the 3-(4-methyl-3-pentenyl)-3-sulfolene treated.

7. In a process for the production of sulfolane compounds wherein a sulfolene compound is brought in contact in the liquid state, with hydrogen in the presence of an active nickel hydrogenation catalyst and at a temperature below that at which said sulfolene compound undergoes thermal decomposition, the improvement which comprises effecting said catalytic hydrogenation in the presence of sodium hydroxide employed in an amount equal to between about 0.02% and about 5% by weight of the sulfolene compound treated.

RUPERT C. MORRIS.
NORTEN C. MELCHIOR.

REFERENCES CITED

The following references are of record in the file of this patent:

UNITED STATES PATENTS

| Number | Name | Date |
|---|---|---|
| 2,183,146 | Michael | Dec. 12, 1939 |
| 2,004,135 | Rothrock | June 11, 1935 |
| 2,233,999 | Farlow | Mar. 4, 1941 |

FOREIGN PATENTS

| Number | Country | Date |
|---|---|---|
| 847,254 | France | Oct. 5, 1939 |

OTHER REFERENCES

Barker: Recueil des Travaux Chimiques des Pays Bas, vol. 58, 778–81 (1939).

Chemical Abstracts, 32, 6617, 6618 (1936).

Chemical Abstracts, 29, 5818, 5819 (1933).

Berkman: "Catalysis," 367, 368, 822, 825, 840, 843, 858. Reinhold Publ. Co., N. Y., 1940.